(12) United States Patent
Eisenhardt et al.

(10) Patent No.: US 8,485,759 B2
(45) Date of Patent: Jul. 16, 2013

(54) METHOD FOR STABILISING AND SECURING RIVERS, SLOPES AND EMBANKMENTS

(75) Inventors: Andrea Eisenhardt, Vechta (DE); Marcus Leberfinger, Georgsmariehuette (DE); Joachim Roser, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 569 days.

(21) Appl. No.: 11/917,107

(22) PCT Filed: Jun. 14, 2006

(86) PCT No.: PCT/EP2006/063242
§ 371 (c)(1),
(2), (4) Date: Jan. 11, 2008

(87) PCT Pub. No.: WO2006/134147
PCT Pub. Date: Dec. 21, 2006

(65) Prior Publication Data
US 2008/0213044 A1    Sep. 4, 2008

(30) Foreign Application Priority Data

Jun. 14, 2005 (DE) .......................... 10 2005 027 551

(51) Int. Cl.
*E02D 17/20* (2006.01)
(52) U.S. Cl.
USPC ........................................ 405/302.6; 405/17
(58) Field of Classification Search
USPC .............. 405/15–17, 19, 21, 263, 268, 302.4, 405/302.6, 303; 523/132, 131; 106/718, 721
See application file for complete search history.

(56) References Cited

U.S. PATENT DOCUMENTS

| 1,359,575 | A | * | 11/1920 | Chenoweth | ...................... 405/17 |
| 3,376,629 | A | * | 4/1968 | Baumann et al. | .......... 52/309.17 |
| 4,107,112 | A | * | 8/1978 | Latta et al. | ..................... 523/132 |
| 4,728,544 | A | * | 3/1988 | Asoshina et al. | .......... 427/407.3 |
| 4,933,744 | A | | 6/1990 | Segawa et al. | |
| 5,320,871 | A | * | 6/1994 | Agro et al. | ..................... 427/386 |
| 5,626,761 | A | | 5/1997 | Howery et al. | |
| 6,037,435 | A | * | 3/2000 | Hayashi et al. | ................ 528/103 |
| 6,228,500 | B1 | | 5/2001 | Hiroshige et al. | |

FOREIGN PATENT DOCUMENTS

| DE | 1946469 B | * | 3/1971 |
| DE | 35 02 997 | | 7/1986 |
| DE | 102 41 293 | | 3/2004 |
| EP | 0 037 442 | | 10/1981 |
| EP | 1 300 439 | | 4/2003 |
| FR | 2 722 223 | | 1/1996 |
| JP | 56125534 A | * | 10/1981 |
| JP | 59085013 A | * | 5/1984 |
| JP | 2001234546 A | * | 8/2001 |
| KR | 2003026643 A | * | 4/2003 |
| WO | 99/50369 | | 10/1999 |

* cited by examiner

*Primary Examiner* — Sunil Singh
(74) *Attorney, Agent, or Firm* — Oblon, Spivak, McClelland, Maier & Neustadt, L.L.P.

(57) ABSTRACT

The invention relates to a method for stabilizing and securing banks, hillsides and slopes, and structures present at least partly in moving waters, such as supporting and construction elements, by composite materials comprising mineral particles, preferably stones, in particular crushed rock, and an epoxy resin.

40 Claims, No Drawings

METHOD FOR STABILISING AND SECURING RIVERS, SLOPES AND EMBANKMENTS

DESCRIPTION

The invention relates to a method for stabilizing and securing banks, hillsides and slopes, and structures present at least partly in moving waters, such as supporting and construction elements, by composite materials comprising mineral particles, preferably stones, in particular crushed rock, and an epoxy resin.

The stabilization of banks, in particular bank slopes, is frequently necessary for regulation of flowing waters. In the case of new construction too and in particular in the renovation of waterways and levees, at least regions of the bank must be stabilized.

To date, composite bodies comprising crushed rock and high-quality concrete have been prefabricated and placed at the location of use for such renovation purposes. In this method, however, renovation of damaged regions of the bank on site is not possible. Moreover, the components generally have a very high weight. A further disadvantage of concrete is the lack of elasticity. This means that the concrete does not withstand any stresses and these composites easily become detached.

One possibility for renovating damaged regions of the bank on site is the use of hardening tar formulations or wet concretes or wet mortars which were discharged over the crushed rock of the bank slopes which are to be consolidated. By means of this method, consolidation of the bank slopes can be achieved for a certain time. However, there is in particular the ecological disadvantage that, in the course of time, phenolic or other environmentally harmful compounds may be released from the tar. Furthermore, substantially gap-free structures form in these procedures. Any cavities in the bank region which are present in the interior are filled.

The use of polyurethanes for the production of moldings with mineral ingredients and for stabilizing rock layers, in particular in mining, is also known.

Thus, DE 35 02 997 describes a method for consolidating geological formations in mining by polyurethane foams. Here, the formation to be consolidated is provided with drilled holes which are filled with the mixture of the liquid components for the polyurethane reaction and then closed. The polyurethane foams and is thus distributed in the openings of the rock formation. The formation is consolidated by the subsequent curing of the polyurethane foam. However, such a method cannot be used in the renovation of slopes, in particular bank slopes, since foaming is not desired there since the penetration of water into the foam in the course of time would result in destruction of the foam.

DE 102 41 293 describes a method for stabilizing banks. There, the strongly hydrophobic compact polyurethane is applied to that part of the bank which is to be stabilized. However, this requires a uniform surface of the corresponding bank section.

In another embodiment of this method, moldings are produced by introducing rock, preferably crushed rock, into a mold and applying the polyurethane system thereto, said polyurethane system being understood as meaning the liquid reaction mixture of the starting components of the polyurethane. The molding formed after the curing can be placed on the bank slope.

In both cases, however, uniform distribution of the polyurethane on the rock can scarcely be achieved. When the system is distributed over the bank slope, insufficient consolidation of the slope can moreover occur, particularly in the case of a non-uniform ground.

It was an object of the invention to provide a simple method for stabilizing and securing banks, hillsides and slopes, or structures present at least partly in moving waters, in which a high strength of the bank can be achieved and in which the stabilized bank also withstands a high mechanical load.

The object could be achieved by stabilizing and securing the bank, the hillside, the slope or the structure by composites comprising an epoxy resin and loose mineral particles. For this purpose, the liquid starting components of the epoxy resin are applied to the mineral particles and the epoxy resin is cured. Thus in a first step, the liquid starting components of an epoxy resin can be mixed with mineral particles in a mixing apparatus and, in a second step, this mixture can be discharged onto the bank section to be stabilized or on the structures present at least partly in moving waters, such as supporting and construction elements. Furthermore, the mixture of an epoxy resin with mineral particles can also be introduced into a mold, where the epoxy resin cures. The molding obtained is then applied to the bank section to be stabilized or to the structures present at least partly in moving waters, such as supporting and construction elements.

The invention accordingly relates to a method for the production of a composite comprising an epoxy resin and loose mineral particles, comprising the steps a) mixing of the loose mineral particles with the liquid starting components of the epoxy resin in a mixer,
b) discharge of this mixture from the mixer,
c) curing of the epoxy resin.

The loose mineral particles are preferably stones, particularly preferably crushed rock, in particular crushed granite. The mineral particles preferably have a size of from 0.1 to 50 cm, particularly preferably from 1 to 50 cm, more preferably from 1 to 20 cm, particularly preferably from 2 to 15 cm, in particular from 2.5 to 6.5 cm.

In principle, all devices with which substantially complete wetting of the mineral particles with the liquid starting components of the epoxy resin is possible can be used as mixers for mixing the loose mineral particles with the starting components of the epoxy resin. Mixers which consist of an open container, for example a drum, which is preferably provided with internals, has proven particularly suitable. For the mixing, either the drum can be rotated or the internals can be moved.

Such mixtures are known and are used, for example, in the building industry for the production of concrete mixes.

If the mixture is applied directly to the surface to be stabilized, it may be advantageous to attach the mixer to a vehicle, for example a tractor, a frontloader or a truck. In this embodiment of the method according to the invention, the mixture can be transported in each case to the place where it is to be applied. After emptying of the mixer, the mixture can be distributed manually, for example by means of rakes.

In an embodiment of the method according to the invention, the mixing of the mineral particles with the liquid starting components of the epoxy resin is effected continuously. For this purpose, the mineral particles and the liquid starting components of the epoxy resin are introduced continuously into the mixer and the wetted mineral particles are continuously discharged. In this procedure, it is necessary to ensure that the starting materials remain in the mixer for so long that sufficient wetting of the mineral particles can take place. Expediently, such a mixing apparatus can be moved along the sections to be stabilized at a speed such that the mineral particles wetted with the liquid starting components of the epoxy resin are discharged from the mixer in an amount required for stabilization. It is also possible to operate the continuous mixing means in a stationary manner and to transport the wetted mineral particles discharged from the mixer to the desired location.

In a further embodiment of the continuous development of the method according to the invention, the mixer may be a rotating drum into which mineral particles are introduced continuously. This drum is equipped with nozzles which continuously distribute the starting components of the epoxy resin over the mineral particles. Here, the rotation of the drum ensures thorough mixing of epoxy resin and mineral particles. Epoxy resin/mineral particle composites are then discharged continuously through an opening at the end of the drum. The rotating drum may be horizontal but may also be inclined at various angles in order to promote the discharge.

In a further embodiment of the continuous method, the mineral particles are transported continuously on a conveyer belt which is moved through a tunnel. Said tunnel has openings through which the starting materials of the epoxy resin are discharged continuously on to the mineral particles. At the end of the conveyer belt, the mineral particles then fall into an open mixing drum, which discharges the composite at an adjustable transport speed.

The thickness of the layer comprising the composite material is preferably at least 3 cm, particularly preferably at least 10 cm. Small layer thicknesses, in particular layer thicknesses of less than 3 cm, frequently have only insufficient stability. The maximum thickness is dependent on the local circumstances and may be, for example up to 5 meters.

In the production of moldings, the mixture of the loose mineral particles with the liquid starting components of the epoxy resin is introduced, after the mixing, into a mold which is preferably open at the top, in which mold the epoxy resin cures. The composite body thus formed can be applied to the bank. The moldings preferably have a size of $100\pm50\times100\pm50\times15\pm10$ cm.

The time for the mixing should be at least such that the mineral particles are wetted as completely as possible with the liquid mixture and at most so long that the epoxy resin has not yet cured.

In a further embodiment, it is also possible to apply the loose mineral particles in the desired thickness to the bank section to be stabilized and to apply the liquid starting components of the epoxy resin by means of a suitable apparatus, for example a spray gun, to said mineral particles, where they are distributed and cure. Compared with the method in which the mineral particles are mixed with the liquid starting components in a mixer, however, this method has the disadvantage that here the distribution of the epoxy resin is more non-uniform and defects where no epoxy resin is present cannot be ruled out. Furthermore, where loosely adhering impurities, such as sand or earth, are present, there may be problems with the adhesion of the mineral particles to one another and hence with the stability of the composite material.

In comparison, when the mineral particles are mixed together with the liquid starting components of the epoxy resin in a mixer, it is also possible to use those mineral particles which have loosely adhering impurities on their surface. These impurities are removed from the surface of the mineral particle by the mechanical stress during the mixing process and therefore can no longer impair the adhesion of the mineral particles to one another.

In a preferred embodiment of the method according to the invention, sand can be applied to the surface of the composite material. To ensure that the sand adheres to the surface, the application of the sand should be effected before curing of the epoxy resin is complete.

Any desired sands may be used. These may be natural sand or synthetic sand, such as slag sand or crushed slag sand.

In a preferred embodiment, quartz sand is used.

The particle size of the sand may vary within wide limits. The particle size is preferably in the customary range of 0.002-2 mm. Fine sand, i.e. sand having a particle size of 0.06-0.2 mm, medium sand having a particle size of 0.2-0.6 mm and/or coarse sand having a particle size of 0.6-2.0 mm are preferably used.

The amount of the sand may be such that the surface of the composite material is substantially covered, but blockage of the pores of the molding does not occur. The sand is preferably applied in an amount of from 2 to 4 kg/m$^2$ of the molding.

The sand results in reinforcement of the contact points between the mineral particles. Furthermore, the sand improves the UV protection of the composite material.

The rough surface produced by the sand promotes the settlement of living organisms, such as plants and mosses, on the composite material distributed. This may be advantageous, for example, when distributing the composite material in nature conservation areas.

The ratio of epoxy resin to mineral particles is chosen so that sufficient strength of the composite is ensured. The exact amounts also depend, for example, on the level of the stress of the composite material on the respective bank sections.

Since, in the case of the composites according to the invention, the mineral particles are bonded to one another substantially at the contact surfaces, gaps form and the composites are water-permeable. Consequently, the energy with which the water strikes the composite comprising crushed rock is better adsorbed by the escape of the water in cavities and does not lead to destruction of the composite material.

In the present invention, banks may be understood as meaning the banks of streams, rivers or canals. Furthermore, the banks may be shores of lakes, reservoirs or coastal sections of seas. They may be flat shores, slopes, dams, platforms or levees. Furthermore, hillsides and slopes, for example in landscaping and horticulture or in mountain ranges, can be stabilized and secured by the method according to the invention.

A further possibility for using the method according to the invention is for the protection of structures which are present at least partly in water from so-called subsurface erosion. This is understood as meaning local deepening of the ground of the flowing waters, in particular of stream bottoms, generally in the case of strong water currents in narrow sections, frequently also at bridge piers, where the foundations are attacked by rotating currents, the so-called water roll, due to the congestion and the subsequent stronger gradient. The same effect is to be found, for example, in the case of supporting pillars or bridge piers of sea bridges, water bridges and/or floating bridges, docks, such as floating, solid breakwaters, boat moorings or dry docks, in quays, boat houses, bank walls, drilling rigs, offshore installations, such as wind power installations, sea markers, lighthouses or measuring platforms, hydroelectric power stations, tunnels or piles.

In the protection of structures which are present at least partly in water, it is advantageous to use moldings or first to mix mineral particles with the liquid starting components of the epoxy resin, then to apply the mixture from the mixer on to the desired area and then to cure the epoxy resin on site. The desired area is an area which is present at least partly under water. The distribution of the liquid starting components of the epoxy resin in this application would be disadvantageous since, owing to the water movement and the buoyancy, the components would not be uniformly distributed over the mineral particles.

The geometry of the composites installed to prevent subsurface erosion depends on the respective currents.

The composite materials for preventing subsurface erosion can be installed both directly on the structures and remote from them, depending on the currents.

Owing to the open gap system of the composite bodies, which can absorb hydrodynamic energy so that the wave and flow energy collapses and consequently leads to substantially less subsurface erosion, damage to structures can be avoided and the load-bearing capacity of supporting and construction elements can be increased.

A further advantage is that repairs to the composites can be carried out in a simple manner.

As described, the epoxy resins are those which are prepared from liquid starting components which cure to give solid plastics. The plastics are preferably compact, i.e. they comprise virtually no pores. Compared with cellular plastics, compact plastics are distinguished by greater mechanical stability. Bubbles within the epoxy resin may occur and are generally not critical. However, they should as far as possible be minimized.

In addition, it is preferable if the plastics are hydrophobic. As a result, degradation of the plastics by the water is suppressed.

In the context of this invention, epoxy resins are understood as meaning polymers which are obtained starting from compounds comprising epoxide groups, via these epoxide groups by polyaddition with suitable curing agents or polymerization. Epoxy resins according to the invention are preferably obtained by polyaddition with suitable curing agents.

Preferably used compounds comprising epoxide groups are compounds which have at least two epoxide groups and are liquid at room temperature. It is also possible to use mixtures of different compounds comprising epoxide groups. These compounds are preferably hydrophobic or the mixtures comprise at least one compound comprising epoxide groups which is hydrophobic. Such hydrophobic compounds are obtained, for example, by condensation reaction of bisphenol A or bisphenol F with epichlorohydrin. These compounds can be used individually or as mixtures.

In an embodiment, mixtures of abovementioned hydrophobic compounds comprising epoxide groups with self-emulsifiable hydrophilic compounds comprising epoxide groups are used. These hydrophilic compounds are obtained by introducing hydrophilic groups into the main chain of the compound comprising epoxide groups. Such compounds and processes for the preparation thereof are disclosed, for example, in JP-A-7-206982 and JP-A-7-304853.

Curing agents used are compounds which catalyze the homopolymerization of the compounds comprising epoxide groups or which react covalently with the epoxide groups or the secondary hydroxyl groups such as polyamines, polyaminoamides, ketimines, carboxylic anhydrides and melamine, urea, phenol and formaldehyde adducts. Ketimines, obtainable by reacting a compound having a primary or secondary amino group, such as diethylenetriamine, triethylenetetramine, propylenediamine, or xylylenediamine, with a carbonyl compound, such as acetone, methyl ethyl ketone or isobutyl methyl ketone, aliphatic, alicyclic and aromatic polyamine compounds and polyamide compounds are preferably used. Ketimines or compatible mixtures comprising ketimines are particularly preferably used as curing agents.

The ratio of reactive groups in the curing agent to epoxide groups is preferably from 0.7:1 to 1.5:1, particularly preferably from 1.1:1 to 1.4:1.

Furthermore, in addition to the compounds comprising epoxide groups and the curing agents used, further additives, such as solvents, reactive diluents, fillers and pigments, may be added in the preparation of the epoxy resins. Such additives are known to the person skilled in the art.

Advantages of epoxy resin-based composite systems according to the invention are low cost and easy processability of the starting components of the epoxy resin. Thus, in the processing, for example, virtually no vapors which are hazardous to health occur. Furthermore, mixtures of the liquid starting components of the epoxy resin have a low viscosity, with the result that they can be easily mixed with the mineral particles and can be economically metered. Further advantages of epoxy resin-based composite materials are the high strength, corrosion resistance and good adhesion even on wet surfaces.

We claim:

1. A method for stabilizing and securing a bank present at least partly in moving waters, comprising:
    applying an uncured mixture consisting of an epoxide group-containing compound, one or more curing agents and mineral particles to the bank; and
    curing the mixture to form a composite layer having a thickness of at least 3 cm that stabilizes and secures the bank,
    wherein the mineral particles include particles having a size of from 6.5 cm to 50 cm, and
    wherein the mineral particles are bonded to one another substantially at contact surfaces to form a water permeable structure having gaps between the bonded mineral particles.

2. The method according to claim 1, wherein the composites according to claim 1 are formed by applying the epoxide group-containing compound and the curing agents to the mineral particles and curing the uncured mixture.

3. The method according to claim 2, wherein sand is applied to the surface of the mineral particles after the application of the epoxide group-containing compound and the curing agents to the mineral particles and before the curing of the uncured mixture.

4. The method according to claim 2, wherein the epoxide group-containing compound and the curing agents are applied to the mineral particles by mixing mineral particles and the epoxide group-containing compound and the curing agents in a mixer and then discharging the mixture obtained from the mixer.

5. The method according to claim 4, which is carried out batchwise.

6. The method according to claim 4, which is carried out continuously.

7. The method according to claim 1, wherein the composite is formed by applying the loose mineral particles to the bank to be secured and then applying the epoxide group-containing compound and the curing agents.

8. The method according to claim 1, wherein the curing comprises a condensation reaction of a bisphenol with epichlorohydrin.

9. The method according to claim 1, further comprising:
    before the applying, mixing the epoxide group-containing compound, the curing agents and the mineral particles to form the uncured mixture.

10. The method according to claim 1, wherein the composite layer has a thickness of at least 10 cm.

11. The method according to claim 1, wherein the mineral particles include particles having a particle size of 0.06-2.0 mm.

12. The method according to claim 1, wherein the bank is a bank of a stream river or canal.

13. The method according to claim 1, wherein the bank is a shore of a lake, a reservoir or a coastal section of a sea.

14. The method according to claim 1, wherein the curing agent is at least one of a polyamine, a polyaminoamide, a ketimine, a carboxylic anhydride, a melamine, a urea, a phenol and a formaldehyde adduct.

15. The method according to claim 1, wherein the composite layer formed by the curing is a thermoset.

16. The method of claim 1, wherein the applying is carried out at ambient temperature.

17. The method according to claim 1, wherein the uncured mixture is applied directly to the bank.

18. The method according to claim 1, wherein all of the curing is a polyaddition of epoxide groups of the epoxide group-containing compound.

19. The method according to claim 1, wherein the composite layer consists of an epoxy resin formed by the curing and the mineral particles.

20. The method according to claim 1, wherein the mineral particles have a size of from 6.5 to 50 cm.

21. A method, comprising:
applying an uncured mixture consisting of an epoxide group-containing compound, one or more curing agents and mineral particles to a bank; and
curing the uncured mixture to form a composite layer having a thickness of at least 3 cm and to stabilize and secure the bank;
wherein at least a portion of the uncured mixture applied to the bank is cured under water,
wherein the mineral particles include particles having a particle size of 6.5 cm to 50 cm, and
wherein the mineral particles are bonded to one another substantially at contact surfaces to form a water permeable structure having gaps between the bonded mineral particles.

22. The method according to claim 21, further comprising:
before the applying, mixing the epoxide group-containing compound, the curing agents and the mineral particles to form the uncured mixture.

23. The method according to claim 21, wherein the curing comprises a condensation reaction of a bisphenol with epichlorohydrin.

24. The method according to claim 21, further comprising:
applying sand to the uncured mixture present on the bank during the curing.

25. The method according to claim 21, wherein the composite layer has a thickness of at least 10 cm.

26. The method according to claim 21, wherein the mineral particles include particles having a particle size of 0.06-2.0 mm.

27. The method according to claim 21, wherein the bank is a bank of a stream river or canal.

28. The method according to claim 21, wherein the bank is a shore of a lake, a reservoir or a coastal section of a sea.

29. The method according to claim 21, wherein the curing agent is at least one of a polyamine, a polyaminoamide, a ketimine, a carboxylic anhydride, a melamine, a urea, a phenol and a formaldehyde adduct.

30. The method according to claim 21, wherein the composite layer formed by the curing is a thermoset.

31. The method of claim 21, wherein the applying is carried out at ambient temperature.

32. The method according to claim 21, wherein the uncured mixture is applied directly to the bank.

33. The method according to claim 21, wherein all of the curing is a polyaddition of epoxide groups of the epoxide group-containing compound.

34. The method according to claim 21, wherein the composite layer consists of an epoxy resin formed by the curing and the mineral particles.

35. The method according to claim 21, wherein the mineral particles have a size of from 6.5 to 50 cm.

36. A method for stabilizing and securing a bank present at least partly in water, comprising:
applying an uncured mixture consisting of a curable epoxy group-containing compound, one or more curing agents and mineral particles to the bank; and
curing the uncured mixture to form a water-permeable composite layer having gaps between the mineral particles and a thickness of at least 3 cm to thereby stabilize and secure the bank,
wherein at least a portion of the uncured mixture applied to the bank is cured under water, and
wherein the mineral particles include particles having a particle size of from 6.5 cm to 50 cm.

37. The method according to claim 36, wherein the uncured mixture is applied directly to the bank.

38. The method according to claim 36, wherein all of the curing is a polyaddition of epoxide groups of the epoxide group-containing compound.

39. The method according to claim 36, wherein the composite layer consists of an epoxy resin formed by the curing and the mineral particles.

40. The method according to claim 36, wherein the mineral particles have a size of from 6.5 to 50 cm.

* * * * *